P. A. M. J. ANGEBAUD.
PROTECTING DEVICE AGAINST X-RAYS AND SIMILAR RADIATIONS.
APPLICATION FILED SEPT. 28, 1917.
1,368,094. Patented Feb. 8, 1921.
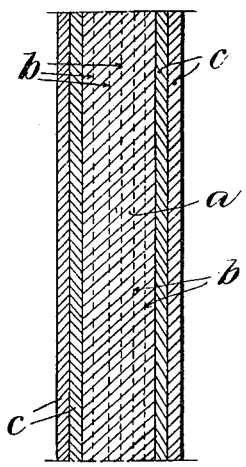
Pierre Anne Marie Joseph Angebaud
Inventor

UNITED STATES PATENT OFFICE.

PIERRE ANNE MARIE JOSEPH ANGEBAUD, OF NANTES, FRANCE.

PROTECTING DEVICE AGAINST X-RAYS AND SIMILAR RADIATIONS.

1,368,094.     Specification of Letters Patent.     Patented Feb. 8, 1921.

Application filed September 28, 1917. Serial No. 193,679.

*To all whom it may concern:*

Be it known that I, PIERRE ANNE MARIE JOSEPH ANGEBAUD, a citizen of the Republic of France, residing at 18 Rue Lamartine, Nantes, Loire Inférieure, in the Republic of France, have invented new and useful Improvements in Protecting Devices Against X-Rays and Similar Radiations, of which the following is a specification.

Various materials which are opaque to X-rays and to rays produced by radio-active bodies or substances have already been proposed for the manufacture of shields, panels, plates, cups or similar devices which are used for protecting operators from the nocuous action of X-rays or similar radiations, such materials have usually been obtained by combining certain opaque salts or substances with an adhesive substance such as glue, shellac or rubber, the article being reinforced by the use of large mesh fabrics, fibers, felting, wood backing or other reinforcing means.

The object of the present invention is the substitution of silicate of potassium or sodium for the adhesive substances commonly used in the manufacture of the aforesaid protecting devices.

The opaque mixture which forms the raw material for the manufacture of said devices can thus be made up of opaque salts or substances and silicate of sodium or potassium.

The composition thus obtained may be reinforced, that is it can contain layers of fabric, fibers or felting which make up the strengthening portion.

The outer layers of wood backing or analogous material usually employed as a protection will now be preferably omitted, and only the opaque mixture is retained, this being reinforced by any thin and light cloth.

The concave disks, plates and other objects opaque to X-rays thus obtained, can be readily colored either by incorporating a coloring matter into the silicate, or a powdered color into the opaque salts. The use of silicates gives the following advantages: easier method of manufacture, a more homogeneous composition, a more uniform opacity, a still more efficient protection, a more rapid-drying, a better insulation, and a greater degree of solidity of the whole.

The annexed drawing is a diagrammatical cross section of a plate or shield constructed in accordince with the present invention.

As shown in the drawing, a shield or protecting plate is formed of a mixture $a$ of opaque salts with an alkaline silicate such as silicate of sodium or potassium. Bands of tarlatan, muslin or a similar open work fabric may be embedded in said mixture as shown at $b$ to act as reinforcing means. Outer walls $c$ formed of veneer may be used if desired but the same will preferably be omitted.

Having now described my invention, what I claim as new and desire to secure by Letters Patent is:

1. A protecting device which is opaque to X-rays and to radiations from radio-active substances, containing, in combination, opaque substances, an alkaline silicate and a sustaining and reinforcing structure, substantially as described and for the purpose set forth.

2. A protecting device which is opaque to X-rays and to radiations from radio-active substances, containing, in combination, opaque substances, an alkaline silicate, a coloring substance and a sustaining and reinforcing structure, substantially as described and for the purpose set forth.

3. A protecting device which is opaque to X-rays and to radiations from radio-active substances, containing, in combination, opaque substances, silicate of potassium, a coloring substance incorporated into the silicate and a large meshed sustaining tissue, substantially as described and for the purpose set forth.

In testimony whereof I have signed my name to this specification in the presence of two subscribing witnesses.

PIERRE ANNE MARIE JOSEPH ANGEBAUD.

Witnesses:
    LOUIS MOSÉ,
    CHAS. P. PRESSLY.